Inventor
WILLIAM WALLACE WILLIAMS

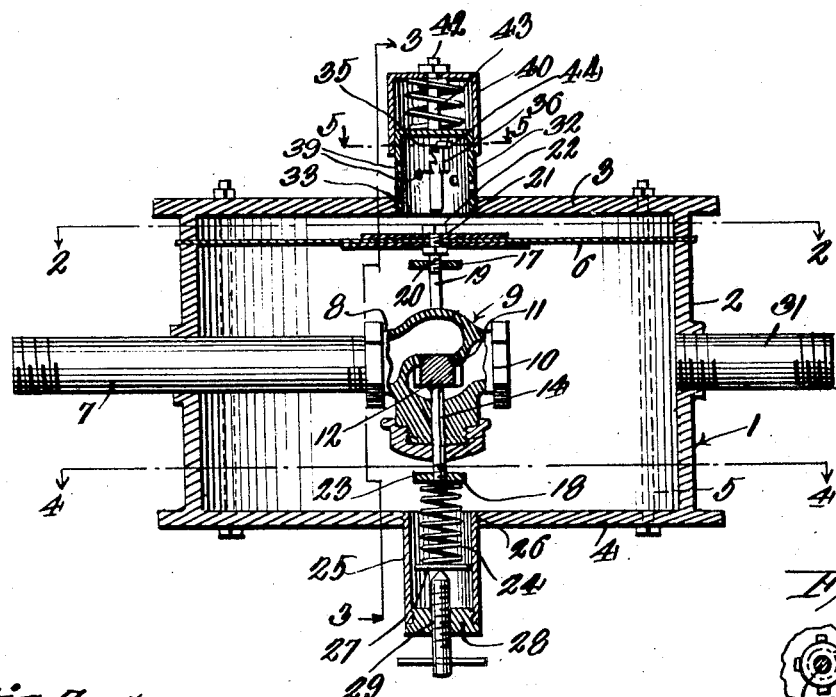
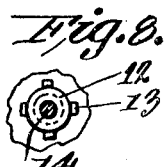
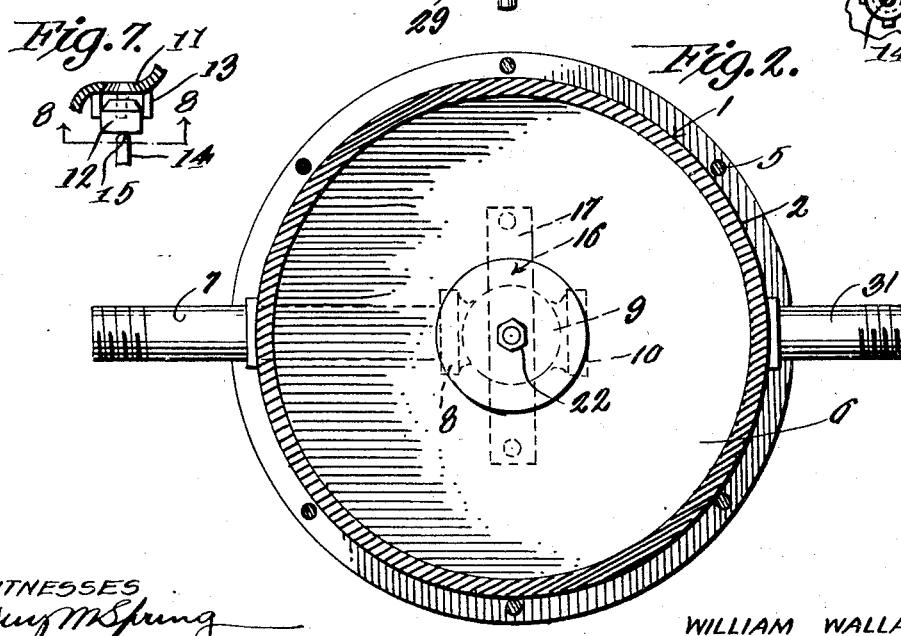
Fig. 1. Fig. 2. Fig. 7. Fig. 8.
Inventor
WILLIAM WALLACE WILLIAMS June 24, 1930.   W. W. WILLIAMS   1,766,274
GAS REGULATOR
Filed May 19, 1928    2 Sheets-Sheet 2

Patented June 24, 1930

1,766,274

UNITED STATES PATENT OFFICE

WILLIAM WALLACE WILLIAMS, OF LUBBOCK, TEXAS, ASSIGNOR TO THE FEDERAL SUPPLY COMPANY, A CORPORATION OF TEXAS

GAS REGULATOR

Application filed May 19, 1928. Serial No. 279,088.

This invention relates to improvements in gas regulators for gas engines and has as its primary object to provide means adapted to be installed in the gas supply line for the engine and operating automatically to regulate the supply of gas to the engine in consonance with variations in the load imposed upon the engine, the invention contemplating a regulator so constructed as to effect supply of gas to the engine precisely in accordance with the requirements of the engine to operate a machine or perform other work under certain load conditions and which regulator will be entirely automatic in its operation to vary the supply of gas as the load upon the engine is varied.

It is a well known fact that the amount of gas required for the successful operation of the engine varies in accordance with the amount of work to be performed by the engine and therefore the present invention contemplates a regulator for the purpose above stated embodying a diaphragm which is subjected to the suction force of the engine in taking in gas, a valve for regulating the supply of gas, and a direct connection between the diaphragm and valve of such a character as to insure of accurate automatic adjustment of the valve in accordance with fluctuations of the diaphragm.

Another object of the invention is to provide, in a regulator of the type referred to above, novel means for effecting automatic closing of the control valve of the regulator in the event of breakage or leakage of the diaphragm thereby obviating waste of gas, the invention contemplating the provision of a connection between the said valve and the diaphragm of such character as to be devoid of parts subject to wear, the invention, in this respect, also contemplating the elimination of gears, levers, and other parts for establishing connection between the diaphragm and valve.

Another object of the invention is to provide a regulator of the character above stated including a casing, a diaphragm mounted within the casing, a gas inlet pipe extending into the casing, a valve for controlling the delivery of gas from said pipe into the casing, a pipe for conducting the gas from the casing to the engine, operative connection between the diaphragm and valve for controlling the latter and thereby control the flow of gas, together with means whereby air may be admitted to the casing at that side of the diaphragm opposite the side at which the valve is located, and the admission of air suitably controlled, so as to obviate hammering of the valve against its seat.

Another object of the invention is to provide, in a regulator constructed as above briefly outlined, means whereby the valve may be adjusted to open position and maintained in such position for testing the flow of gas.

While the accompanying drawings and the description which is to follow, constitute a disclosure of the preferred embodiment of the invention, it will be understood that various changes may be made within the scope of what is claimed.

In the accompanying drawings:

Figure 1 is a vertical diametric sectional view through the regulator embodying the invention.

Figure 2 is a horizontal sectional view taken substantially on the line 2—2 of Figure 1 looking in the direction indicated by the arrows.

Figure 7 is a detail view partly in section and partly in elevation illustrating the control valve and its seat, the valve being in open position.

Figure 8 is a horizontal sectional view taken substantially on the line 8—8 of Figure 7 looking in the direction indicated by the arrows.

Figure 3:
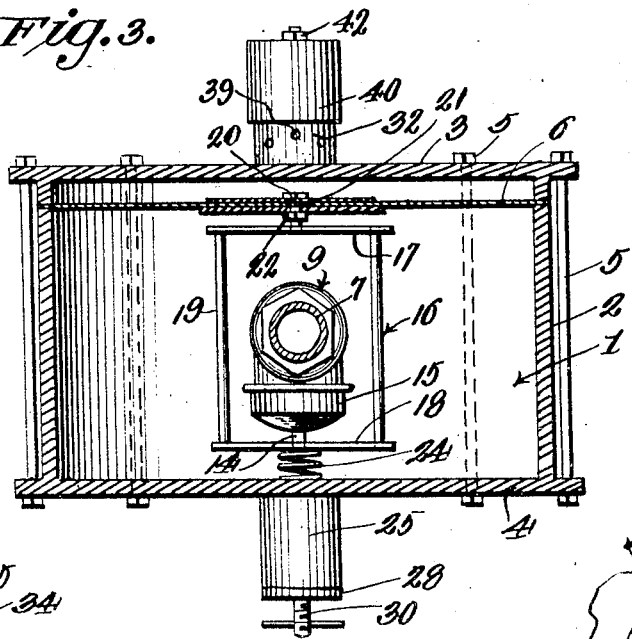
Figure 3 is a vertical substantially diametric sectional view taken on the line 3—3 of Figure 1 looking in the direction indicated by the arrows.
Figure 5:
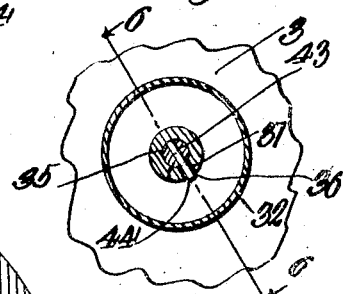
Figure 5 is a detail horizontal sectional view taken substantially on the line 5—5 of Figure 1 looking in the direction indicated by the arrows.
Figure 6:
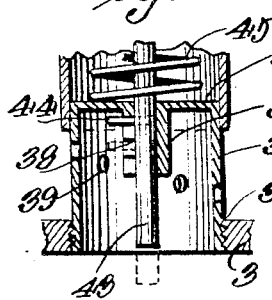
Figure 6 is a vertical diametric sectional view taken substantially on the line 6—6 of Figure 5 looking in the direction indicated by the arrows.
Figure 4:
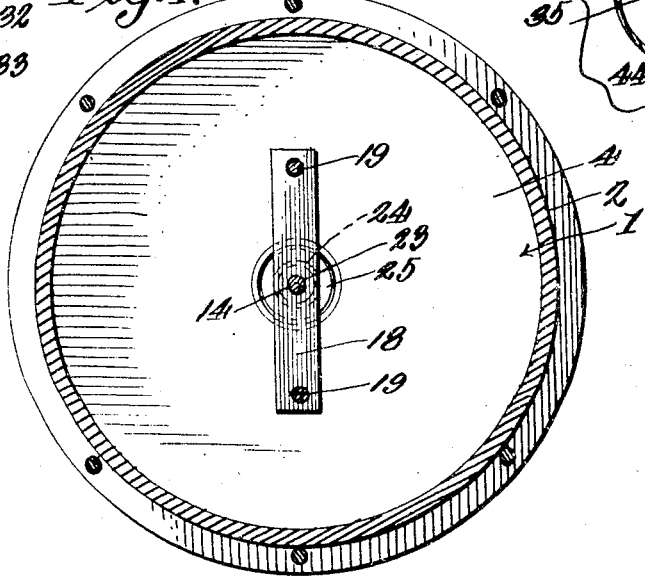
Figure 4 is a horizontal sectional view on the line 4—4 of Figure 1 looking in the direction indicated by the arrows.

The regulator embodying the invention comprises a casing 1 which may be of cast metal and which comprises a cylindrical wall 2, a closure 3 constituting the top wall of the casing, and a bottom 4, the closure 3 being secured in place upon the casing through the medium of a series of bolts 5 secured through a projecting peripheral flange on the said closure and a corresponding flange on the bottom 4, the margin of a circular diaphragm 6 being arranged between the upper edge of the wall 2 of the casing and the rim of the top or closure 3 and which diaphragm serves a purpose which will presently be described.

Gas from a main or pipe line is led into the casing of the regulator through a pipe 7 mounted in the wall 2 of the body of the casing at one side thereof, and at its inner end this pipe communicates with the intake branch 8 of the casing of the control valve of the regulator which valve is indicated in general by the numeral 9. The valve casing includes an outlet branch 10 which opens into the casing 1 and the said casing is provided interiorly with a valve seat 11 between the inlet branch 8 and outlet branch 10. A valve head 12 coacts with the seat 11 and is slidably guided in its movement into and out of engagement with the seat by a series of guide fingers 13 which are arranged in spaced relation to one another about the lower side of the seat 11. A stem 14 is slidably mounted through the bottom of the valve casing and has a rounded upper end 15 engaging against the under side of the valve head 12, this construction permits of free rotation of the valve head so as to prevent uneven wear.

Inasmuch as the valve 12 is, in accordance with the principles of the invention, to be controlled through the medium of the diaphragm 6, operative connection is provided between the said diaphragm and the stem 14 and this connection is preferably in the nature of a rectangular yoke 16 comprising top and bottom cross bars indicated by the numerals 17 and 18 respectively, and side rods 19 which extend between the ends of the top and bottom cross bars and connect the same. By reference to Figure 3 it will be observed that the yoke straddles the valve casing 9 with the cross bars 17 and 18 extending respectively above and below the casing, and as shown in Figures 1 and 3, a threaded stem 20 is fitted into the top cross bar 17 of the yoke intermediate the ends thereof and is fitted through openings 21 formed centrally in the plies of the diaphragm 6, nuts 22 being threaded upon this portion of the stem and tightened to bind against the upper and under sides of the said diaphragm. The lower end of the stem 14 is threaded as indicated by the numeral 23 and fitted into a threaded opening formed in the lower cross bar 18 of the yoke intermediate the ends thereof. At this point it will be evident that flexing of the diaphragm 6 will result in reciprocatory motion being imparted to the stem 14 through the medium of the yoke.

In order that the valve may be yieldably held to its seat and its opening movement be yieldably resisted to a suitable degree, a compression spring 24 is arranged to bear at its upper end against the bottom cross bar 18 of the yoke 16 and the lower portion of this spring is received in a nipple 25 which is threaded at its upper end into an opening 26 formed centrally in the bottom 4 of the casing 1, a washer 27 being arranged within the nipple and supporting the lower end of the spring, and a cap 28 being threaded into the lower end of the nipple and formed with a threaded opening 29 in which is adjustably threaded an abutment screw 30 upon the upper end of which the washer 27 is supported, it being understood that by adjusting this screw the tension of the spring 24 may be varied as desired and consequently a greater or less resistance offered to the movement of the valve 12 to open position.

Gas is delivered from the casing 1 to the engine by way of a delivery pipe 31 which is fitted at one end into wall 2 of the casing 1 preferably diametrically opposite the gas inlet pipe 7 and it will be understood at this point, that on the suction stroke of the engine, the suction created within the casing will result in downward flexing of the diaphragm 6 against the tension of the spring 24, relieving the valve 12 of the pressure of the pin 14 thus permitting opening of the valve 12 to admit a charge of gas to the casing and its supply to the engine. This operation of the valve 12 will take place at each intake stroke of the engine and it will be evident at this point that the diaphragm 6 will be flexed a distance in consonance with the load imposed upon the engine, which load determines the degree of suction created within the cylinder of the regulator. Therefore the valve 12 will be permitted to open automatically a distance in consonance with the increase or decrease in load on the engine, and, as a consequence, precisely the amount of gas will be supplied to the engine as is required to insure of efficient operation of the engine.

It is of course desirable that atmospheric pressure be maintained above the diaphragm 6 so that the diaphragm will be sensitive to the suction created in the casing 1 and it is also desirable that, in the event of leakage in the diaphragm or any damage to the diaphragm, sufficient gas be supplied by way of the regulator, to maintain the engine in operation until repairs can be made on the diaphragm, and in order that these results may be obtained, means is provided which will now be described.

The means referred to above comprises a cylindrical nozzle 32 which is threaded at its lower end, as at 33, into an opening formed centrally in the closure 3, the said nozzle being closed at its upper end as indicated by the numeral 34 and provided upon the under side of its closed end with a centrally located, depending sleeve 35 which is formed in one side with a recess 36 one wall of which, indicated by the numeral 37, is vertically disposed, whereas the other wall is formed on an incline and with a series of notches providing downwardly presented shoulders 38. Air inlet openings 39 are formed in the wall of the nozzle 32 and are arranged in a series extending circumferentially of the said wall and on an incline, so that the openings, throughout the series, are spaced successively greater distances above the plane of the closure 3. A cylindrical cap 40 is fitted onto the spout 32 and is provided with a closed upper end in which is anchored, by nuts 42, the upper end of a stem 43 which projects downwardly axially within the cap 40 and slidably fits in the sleeve 35. A pin 44 is mounted upon the stem 43 and projects radially therefrom and into the recess 36, and this pin is adapted to seat in the upper end of the recess, when the cap 40 is in full elevated position as shown in Figure 1 of the drawings, or may engage against one or another of the shoulders 38 when the cap is in a partly or full lowered position. A compression spring 45 is disposed about the stem 43 and bears at its upper end against the closed top of the cap and at its lower end against the closed top 34 of the spout 32 and yieldably urges the cap in an upward direction.

It will be observed by reference to Figure 1 of the drawings that when the cap 40 is in a full elevated position, all of the openings 39 will be uncovered and the stem 43 will likewise be in an elevated position, the pin 44, at such time, seating in the upper end of the recess 36. In this position of the stem 43, its lower end will be spaced a considerable distance above and in axial alinement with the upper end of the threaded stud 20 which connects the yoke 16 with the diaphragm 6. Inasmuch as the openings 39 are, as stated, arranged in a circumferential series and are spaced successively greater distances above the closure 3, all of the openings will be exposed when the cap 40 is in the full elevated position. However, when the cap 40 is pressed downwardly and slightly rotated to effect engagement of the pin 44 with one or another of the shoulders 38, the lower end of the cap will serve to cover and close a greater or less number of the vent openings 39 and in this manner the admission of air into the casing 1 above the diaphragm 6 may be regulated so as to suitably vary the sensitiveness of the diaphragm 6 or in other words its responsiveness to the suction periods established in the casing 1, thereby preventing hammering of the valve 12 when the engine is operating under a heavy load condition. It will also be evident from the foregoing that when the cap 40 is shifted to full lowered position against the tension of the spring 45 and the pin 44 engaged with the lowermost one of the shoulders 38, all of the vent openings 39 will be closed and air will be excluded from the casing 1 above the diaphragm 6. The cap 40 is so adjusted, in the event of leakage or other damage to the diaphragm, and it will be understood at this point that when the cap is adjusted, its stem 43 will exert downward pressure against the center of the diaphragm 6 thus causing a lowering of the yoke 16 and an opening of the valve 12 so that sufficient gas will flow through the regulator and to the engine to effect operation of the engine, without interruption, while the diaphragm is being repaired.

Having thus described the invention, what I claim is:

1. In a gas regulator of the class described, a casing, a diaphragm within the casing, the diaphragm being located between the closed top and bottom of the casing, a gas inlet pipe leading into the casing below the diaphragm, a gas suction pipe leading from the casing below the diaphragm, a valve within the casing below the diaphragm for controlling the flow of gas from the said inlet pipe to the casing, means yieldably resisting opening movement of the valve, operative means interposed between the diaphragm and the resisting means for rendering the resisting means inactive upon flexing of the diaphragm by the suction in the casing set up by the suction pipe to permit opening of the valve, an air inlet spout in the top of the casing above the diaphragm, the spout having a series of air inlet openings in its wall arranged at successively greater elevations with respect to the said top of the casing, and a cap adjustably mounted upon the spout and in its different positions of adjustment being adapted to extend over a greater or less number of said openings whereby to regulate the supply of air to the casing above the diaphragm.

2. In a gas regulator of the class described, a casing, a diaphragm within the casing, the diaphragm being located between the closed top and bottom of the casing, a gas inlet pipe leading into the casing below the diaphragm, a gas suction pipe leading from the casing below the diaphragm, a valve within the casing below the diaphragm for controlling the flow of gas from the said inlet pipe to the casing, means yieldably resisting opening movement of the valve, operative means interposed between the diaphragm and the resisting means for rendering the resisting means inactive upon flexing of the diaphragm by the suction in the casing set up by the suction pipe to permit opening of the valve, an air inlet spout in the top of the casing above the diaphragm, the spout having a series of air inlet openings in its wall arranged at successively greater elevations with respect to the said top of the casing, a cap adjustably mounted upon the spout and in its different positions of adjustment being adapted to extend over a greater or less number of said openings whereby to regulate the supply of air to the casing above the diaphragm, and means for holding the cap in its positions of adjustment.

3. In a gas regulator of the class described, a casing, a diaphragm within the casing, the diaphragm being located between the closed top and bottom of the casing, a gas inlet pipe leading into the casing below the diaphragm, a gas suction pipe leading from the casing below the diaphragm, a valve within the casing below the diaphragm for controlling the flow of gas from the said inlet pipe to the casing, means yieldably resisting opening movement of the valve, operative means interposed between the diaphragm and the resisting means for rendering the resisting means inactive upon flexing of the diaphragm by the suction in the casing set up by the suction pipe to permit opening of the valve, an air inlet spout in the top of the casing above the diaphragm, the spout having a series of air inlet openings in its wall arranged at successively greater elevations with respect to the said top of the casing, a cap adjustably mounted upon the spout and in its different positions of adjustment being adapted to extend over a greater or less number of said openings whereby to regulate the supply of air to the casing above the diaphragm, means for holding the cap in its positions of adjustment, and means yieldably urging the cap in an upward direction.

4. In a gas regulator of the class described, a casing, a diaphragm within the casing, dividing the same between its closed top and bottom, a gas inlet pipe leading into the casing below the diaphragm, a gas suction pipe leading from the casing below the diaphragm, a valve within the casing below the diaphragm for controlling the flow of gas from the said inlet pipe into the casing, means yieldably resisting opening movement of the valve, operative means interposed between the diaphragm and the resisting means for rendering the resistance means inactive upon flexing of the diaphragm by the suction set up by the pipes whereby to permit opening of the valve, a spout in the top of the casing having a series of air inlet openings in its wall at different elevations with respect to the said top, a cap adjustably fitting the spout and adjustable to cover a greater or less number of said openings and to positions exposing all of said openings and closing all of said openings, and means for holding the cap in its positions of adjustment, the said means comprising a sleeve extending downwardly from the top of the spout and within said spout and provided with a recess one wall of which is notched to provide a series of shoulders, a stem extending downwardly from the cap and slidably through the sleeve, and a pin projecting radially from the stem and engageable selectively with said shoulders.

In testimony whereof, I affix my signature.
WILLIAM WALLACE WILLIAMS.